United States Patent [19]
Meyer

[11] Patent Number: 4,909,815
[45] Date of Patent: Mar. 20, 1990

[54] MOBILE AIR CLEANING APPARATUS

[75] Inventor: Richard R. Meyer, Wayne, Ill.

[73] Assignee: International Air Filter, Inc., Elgin, Ill.

[21] Appl. No.: 261,558

[22] Filed: Oct. 24, 1988

[51] Int. Cl.$^4$ ................. B01D 53/04; B01D 46/02
[52] U.S. Cl. ........................... 55/316; 55/356; 55/473; 55/487; 55/500
[58] Field of Search .............. 55/316, 320, 321, 322, 55/356, 471, 472, 485, 487, 500, DIG. 46, 473; 98/31.5, 34, 36, 34.6, 115.1, 115.4

[56] References Cited

U.S. PATENT DOCUMENTS

| | | |
|---|---|---|
| 3,151,929 | 10/1964 | Potapenko . |
| 3,301,167 | 1/1967 | Howard et al. . |
| 3,395,972 | 8/1968 | Hardison . |
| 3,505,989 | 4/1970 | Truhan ................................. 98/36 |
| 3,511,162 | 5/1970 | Truhan ................................. 98/36 |
| 3,880,061 | 4/1975 | Hensiek et al. . |
| 3,935,803 | 2/1976 | Bush ................................. 55/316 X |
| 3,944,405 | 3/1976 | van Calsteren et al. . |
| 4,045,192 | 8/1977 | Eckstein et al. . |
| 4,512,245 | 4/1985 | Goldman . |
| 4,531,956 | 7/1985 | Howorth . |
| 4,667,580 | 5/1987 | Wetzel ................................. 98/34.6 |
| 4,737,173 | 4/1988 | Kudirka et al. . |

OTHER PUBLICATIONS

Article titled "Introducing Cleanshop Prep Stations", by Cleanshop Division of AEN Industries (no date).

*Primary Examiner*—Charles Hart
*Attorney, Agent, or Firm*—Marshall, O'Toole, Gerstein, Murray & Bicknell

[57] ABSTRACT

Mobile air cleaning apparatus comprising a base, a cabinet which is mounted on and extends upwardly from one end of the base, and a hood which is supported by the upper end of the cabinet and extends over the base. A circular air flow path is formed which includes the open space between the hood and the base, and ducts in the base, the cabinet and the hood. In the air flow path are particle filters, an activated carbon filter, and a blower. The base is mounted on wheels so that the entire apparatus is readily movable.

9 Claims, 2 Drawing Sheets

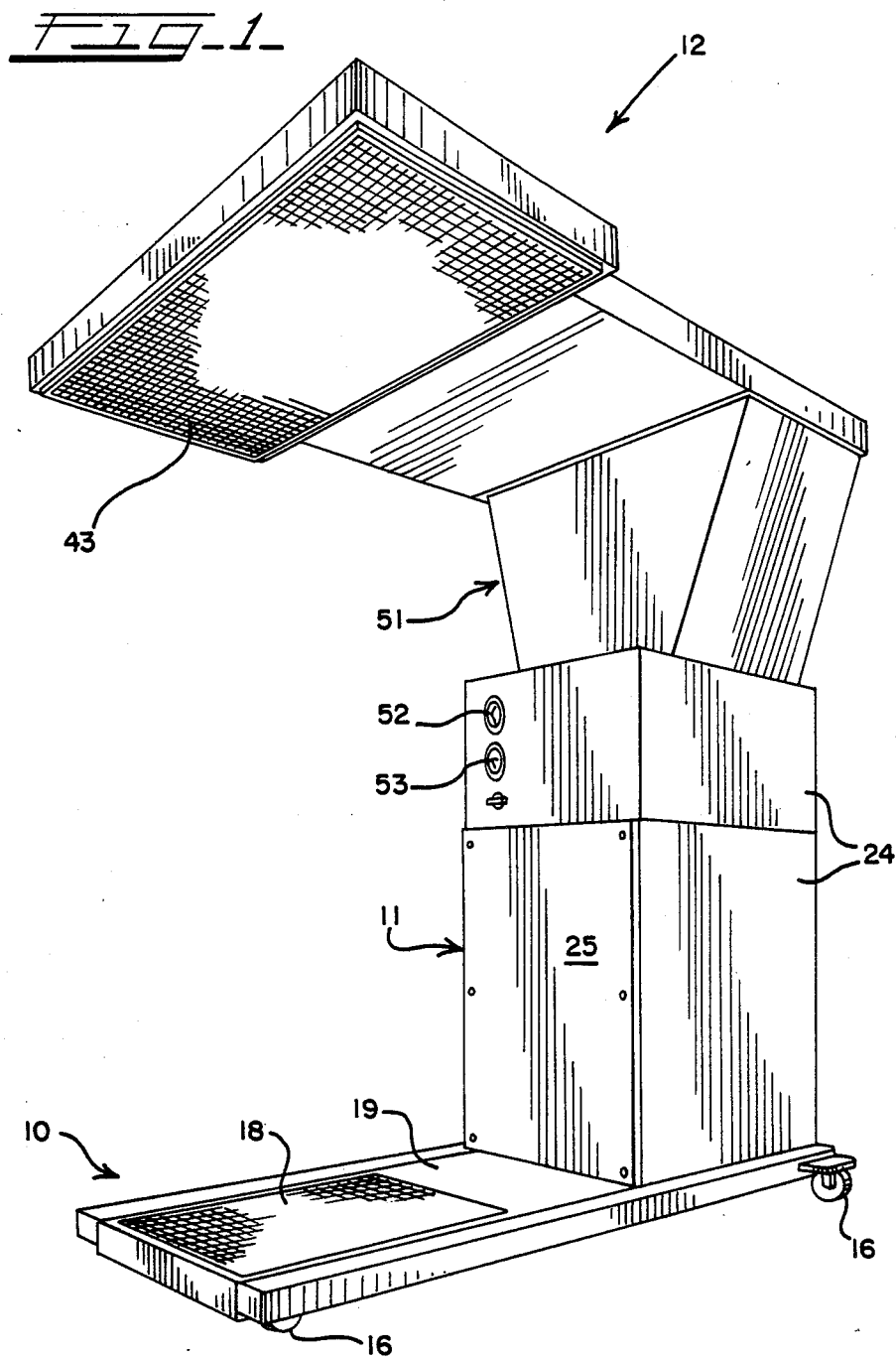

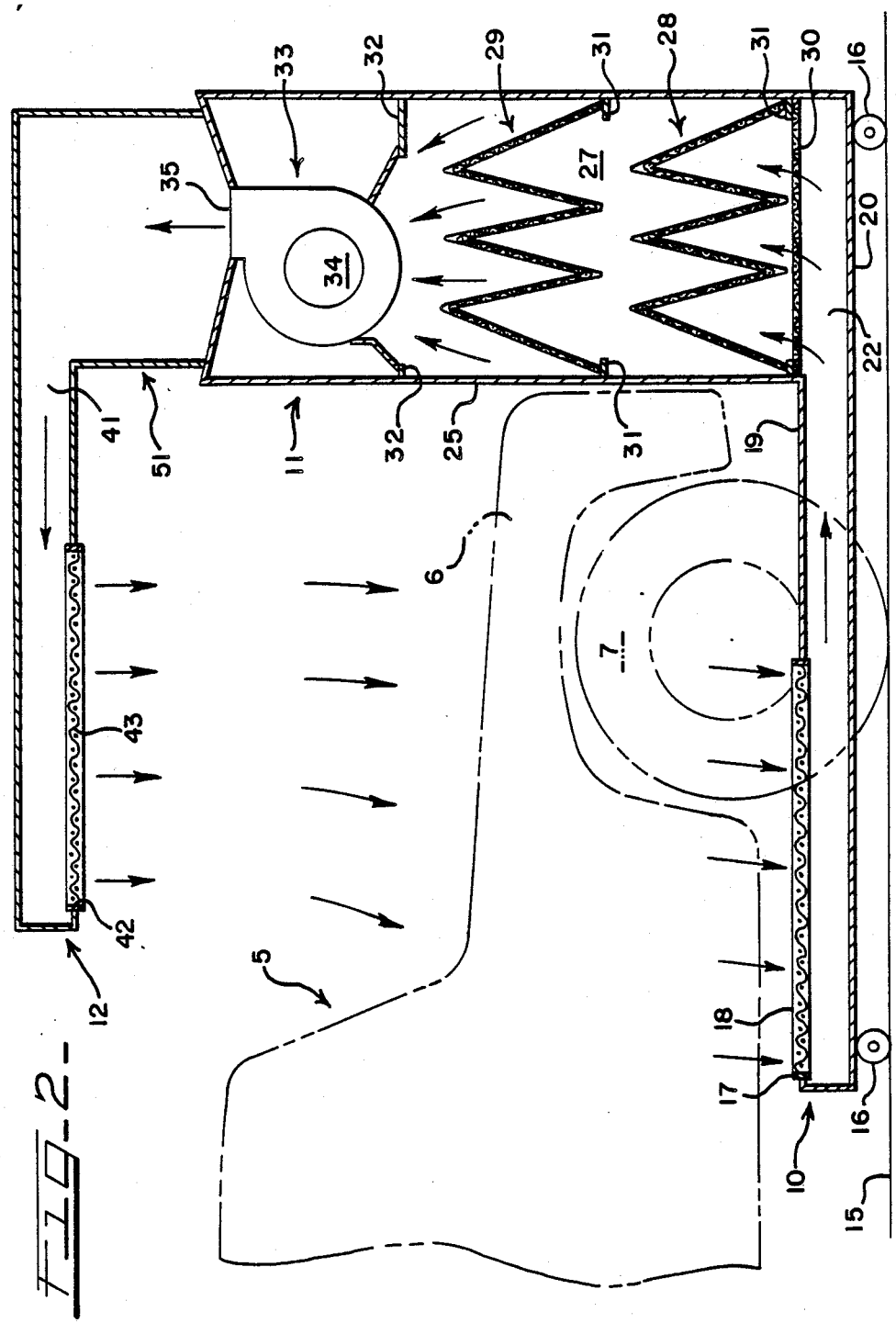

MOBILE AIR CLEANING APPARATUS

FIELD AND BACKGROUND OF THE INVENTION

This invention relates to an air filtering or cleaning apparatus, and more particularly to movable apparatus especially suited for use in vehicle repair and/or assembly plants.

Air cleaning systems have been provided in the past for use in vehicle body repair and finishing plants. For example, the L. C. Hardison U.S. Pat. No. 3,395,972 describes a system for cleaning the air of dust and noxious fumes in a paint spray booth. The Hardison system is quite large and stationary, and it also appears to be a rather elaborate and expensive system.

In addition to the foregoing prior art, there is an air filtering system marketed by CleanShop, which is a division of AEN Industries, Inc. The CleanShop system is also a relatively large stationary system which may be installed in repair shops and industrial factories. Further, it does not appear to have the capability of removing noxious fumes from the air.

Small mobile air filtration systems have also been provided, as shown for example in U.S. Pat. Nos. 3,93,803; 4,045,192; 4,531,956; and 4,737,173. The systems shown in these patents are room air filters for use, for example, in hospitals.

Still other prior art filtering systems are described in U.S. Pat. Nos. 3,151,929; 3,301,167; 3,511,162; 3,880,061; 3,944,405; and 4,512,245.

Despite the large number of prior art air filtering arrangements, there remains a need for a relatively inexpensive lightweight, mobile, air cleaning system for use, for example, in a vehicle body repair shop. It is therefore a general object of the present invention to provide an improved mobile air cleaning system which is especially suited for use in vehicle body shops.

SUMMARY OF INVENTION

Air cleaning apparatus in accordance with this invention comprises a base, a cabinet which is attached to and extends upwardly from one end of the base, and a hood which is supported by the upper end of the cabinet and extends over the base. A circular air flow path is formed which includes the open space between the hood and the base, and ducts in the base, the cabinet and the hood. In the air flow path are particle filters, an activated carbon filter for removing noxious fumes, and a blower, and a final filter-diffuser. The base is mounted on wheels so that the entire apparatus is readily movable to and from job sites, and the components are sized to encompass a part of a vehicle being worked on.

BRIEF DESCRIPTION OF THE INVENTION

The invention will be better understood from the following detailed description taken in conjunction with the accompanying figures of the drawings, wherein:

FIG. 1 is a perspective view of air cleaning apparatus in accordance with the present invention; and FIG. 2 is a diagrammatic view of the apparatus.

DETAILED DESCRIPTION OF THE DRAWINGS

With reference to the drawings, the apparatus comprises a base 10, a cabinet or column 11 which is mounted on and extends upwardly from one end of the base 10, and a hood or overhang 12 which is supported by and extends laterally from the upper end of the cabinet 11. As shown in FIG. 1, the hood 12 extends over the base 10.

The base 10 has a generally rectangular shape when viewed from above, and wheels 16 are fastened to the four corners of the base and support the base on the floor 15. The two wheels at one end of the base (preferably the end under the cabinet) are swivel casters so that the apparatus can be readily maneuvered when moving it to or from job site. The cabinet 11 extends upwardly from one end of the base 10 as previously mentioned, and in the upper side at the other or extended end of the base is formed an air inlet opening 17. A coarse particle filter 18 is mounted in the opening 17.

The base 10 may be formed, for example, by structural steel members at the sides of the base which are secured together to form a rectangular frame. Sheet metal plates 19 and 20 are secured to the structural members and form a hollow interior air flow passage 22 (see FIG. 2). The air inlet opening 17 is in flow communication with the passage 22 so that intake air may flow through the filter 18 and into the passage 22.

The unit is shown in FIG. 2 in use with an automobile 5 including a front fender 6 and a front wheel 7. The maximum vertical height of the base 10 is sized so that it may be rolled under the vehicle 5 as shown. Further, the lateral width of the base is less than the distance between a pair of wheels, and the length of the base from the cabinet to the outer end is sized so that the filter 18 may be located underneath a fender or side of the vehicle. As a specific example (the invention, of course, is not limited to these dimensions), the height of the base may be 5½ inches, its lateral width may be 28 inches, and its length may be 60 inches. With such dimensions and the wheels 16, the apparatus may easily be positioned over and under a part being worked on.

The cabinet 11 is supported on one end of the base 10 and may have a conventional box-like construction. The cabinet 11 may be formed, for example, by structural members at the edges and sheet metal panels covering the sides, the panels being indicated by the reference numeral 24. One panel 25 (FIG. 1) may be removable so that an attendant may have access to the interior of the cabinet in order to inspect or replace filters inside the cabinet.

With reference to FIG. 2, the interior of the cabinet 11 forms a hollow flow passage 27, and the open bottom end is in flow communication with the flow passage 22 of the base 10. At the bottom of the cabinet, a medium efficiency (medium particle size) filter 30 extends across the entrance to the flow passage 27 of the cabinet. Above the filter 30, an activated charcoal filter 28 is mounted across the air flow passage 27, and above the filter 28 is mounted a high efficiency (fine particle size) filter 29 which also extends across the passage 27. The filters 28 and 29 are conventionally mounted by supports 31 which are connected to the sides of the cabinet and the filters. Above the two filters 28 and 29 is mounted a blower 33 which is mounted on supports 32 within the cabinet. The blower 33 has an intake pening 34 which receives air from the lower part of the cabinet and discharges the air upwardly from an outlet opening 35.

The hood 12 is also formed by conventional structural members and sheet metal panels to form an interior air flow passage 41 which is connected to the upper end of the air flow passage 27 of the cabinet 11. A duct 51 connects the hood with the cabinet, and the hood and the duct are supported by the cabinet 11. As a consequence, air discharged from the outlet 35 of the blower 33 flows laterally through the air flow passage 41 of the hood. On the underside of the outer end of the hood 12 is formed an air outlet opening 42 which is in flow communication with the passage 41. A final diffuser-filter 43 is mounted in the opening 42, the filter 43 thereby forming a final filter and also nnsuring that a steady, even flow of air moves downwardly from the hood 12. As indcated by the arrows in FIG. 2, the air flows downwardly around the front fender of the vehicle and is drawn into the intake opening 17 of the base 10.

When viewed from the top, the hood 12, in the present specific example of the invention, has a T-shape, the crossbar of the T including the outlet opening 42 and the filter 43. The distance from the cabinet to the outer end of the hood 12 is less than the corresponding dimension of the base 10 as shown in FIG. 2. However, the lateral width of the crossbar (and the filter 43) is greater than the width of the base 10.

The use of the air cleaning apparatus will be described in connection with a body shop. Assume that the fender 6 of the vehicle 5 has to be repaired and repainted. Prior to beginning work on the fender, the mechanic rolls the air cleaning apparatus to the vehicle and positions the base 10 with the air intake opening 17 and the filter 18 underneath the vehicle closely adjacent te fender to be repaired, as shown in FIG. 1. The hood 12 and the air outlet opening 42 are, o course, displaced upwardly above the vehicle. The vertical height of the hood 12 from the floor may be, for example, between 7 and 8½ feet, so that there is sufficient clearance for the vehicle and for one or more mechanics. After the apparatus is in place adjacent the vehicle, the mechanic starts the electric motor drive for the blower 33, which produces the air circulation through the apparatus and around the fender 6. The blower 33 thereby creates a circular air flow path which includes the space between the hood 12 and the base 10, the air flow passage 22 in the base 10, the air flow passage 27 in the cabinet 11, and the passage 41 in the hood 12.

The first coarse particle filter 18 at the inlet opening 17 prevents any large particles or objects from entering the air flow passages. During repair of a fender, for example, the filter 18 prevents stones and dirt from entering the flow passages, and during a fender painting operation the filter 18 prevents paint particles from moving into the system. The medium efficiency filter 30 is provided to protect the carbon filter 28 from becoming clogged by medium-sized particles. The function of the carbon filter 28 is to remove paint fumes and isocyanates contained in paints from the air flowing through the system. The high efficiency filter 29 removes any sanding dust and also any dust from the carbon filter 28, so that they can no affect a paint finish. As previously mentioned, the final filter 43 serves as a diffuser in order to provide an even flow of the air out of the outlet opening 42.

With reference to FIG. 1, conventional gauges 52 and 53 may be provided to indicate when certain of the filters need replacing. For example, one of the gauges could be associated with the coarse filter 18 and the other associated with the high efficiency filter 29. Each gauge 52 and 53 is connected to pressure sensors on opposite sides of the associated filter and shows the differential pressure across the filter. Of course, if the differential pressure exceeds a certain amount, it indicates that the filter has become clogged and needs replacement. The coarse filter 18 needs frequent replacement but since it is easily accessible, replacement is not a problem. The filters in the cabinet may easily be inspected and/or replaced by removing the panel 25.

The blower 33 may be a multiple speed type, with one blower speed for a sanding operation, another speed for a painting operation and still another speed for a drying operation. The filters may be conventional off-the-shelf types.

It will be apparent from the foregoing that a novel and useful air cleaning apparatus has been provided. The apparatus may be easily moved about on the wheels 16 so that it can be changed from one job location to another or can be removed from the job sites for storage. The apparatus includes a number of filters for removing particulate matter, for removing paint fumes and isocyanates from the air, and for defusion of the air flow.

I claim:

1. Mobile air cleaning apparatus comprising a substantially flat elongated base, a cabinet mounted on one end of said base and supported by said base, an elongated hood having one end thereof mounted on the upper end of said cabinet and supported by said cabinet, the other end of said hood extending over said base, the other end of said base having an air intake opening formed in the upper side thereof and said other end of said hood having an air outlet opening in the bottom side thereof, connected air flow passages in said base, said cabinet and said hood, said air flow passages being connected to said air intake and air outlet openings, a blower mounted in said air flow passages for moving air from said air intake opening, through said air flow passages and out of said air outlet opening, at least one particle filter and at least one charcoal filter mounted in said air flow passages upstream from said blower, and wheel means connected to said base for movably supporting said apparatus on a support surface, whereby said apparatus may be readily moved from one location to another.

2. Apparatus as set forth in claim 1, wherein said base has a width which is less than the distance between the wheels of a motor vehicle and a vertical height which is less than the clearance underneath a motor vehicle.

3. Apparatus as set forth in claim 1, wherein the lengths of said base and said hood from said cabinet to said other end is such that said other ends are positionable below and above the center portion of a motor vehicle.

4. Apparatus as set forth in claim 1, and further including a coarse particle filter mounted in said air intake opening, and a diffuser-filter mounted in said air outlet opening.

5. Apparatus as set forth in claim 1, wherein said other end of said hood has a greater lateral width than said other end of said base.

6. Air cleaning apparatus comprising:
    (a) a base including wheels for supporting said base on the floor, said base being relatively low and sized to be moved under a vehicle, an air intake opening in the upper side of said base and a first air flow passage in said base, and a coarse filter mounted in said air intake opening;
    (b) a cabinet mounted on and extending upwardly from said base, said cabinet having a second air flow passage therein which is connected to receive air from said first air flow passage, an activated charcoal filter and a high efficiency filter mounted in said second air flow passage, and a blower mounted in said second air flow passage for moving air from said first to said second air flow passage and through said coarse, charcoal and high efficiency filters; and (c) a hood attached to and extending laterally from the upper side of said cabinet and over said base, said hood having a third air flow passage therein connected to said second air flow passage, an air outlet opening formed in te bottom side of said hood over said air intake opening, and a diffuser filter mounted in said air outlet opening.

7. Apparatus as set forth in claim 6, wherein said blower is mounted downstream from said charcoal and high efficiency filters.

8. Apparatus sa set forth in claim 7, wherein said high efficiency filter is mounted downstream from said charcoal filter.

9. Apparatus as set forth in claim 6, and further including a medium filter mounted upstream from said blower, said high efficiency and said charcoal filters.

* * * * *